(12) United States Patent
Xu et al.

(10) Patent No.: US 10,795,601 B2
(45) Date of Patent: Oct. 6, 2020

(54) METHOD AND DEVICE FOR STORAGE SYSTEM

(71) Applicant: EMC IP HOLDING COMPANY LLC, Hopkinton, MA (US)

(72) Inventors: Sherry Hongru Xu, Shanghai (CN); Brian Tianfang Xiong, Shanghai (CN); Yuanyang Wu, Shanghai (CN); Yifeng Lu, Shanghai (CN); Alex Minghui Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/384,391

(22) Filed: Dec. 20, 2016

(65) Prior Publication Data

US 2017/0185309 A1 Jun. 29, 2017

(30) Foreign Application Priority Data

Dec. 29, 2015 (CN) .......................... 2015 1 1017667

(51) Int. Cl.
*G06F 3/06* (2006.01)
*G06F 11/16* (2006.01)
*G06F 11/14* (2006.01)

(52) U.S. Cl.
CPC .............. *G06F 3/065* (2013.01); *G06F 3/067* (2013.01); *G06F 3/0617* (2013.01); *G06F 11/1435* (2013.01); *G06F 11/16* (2013.01)

(58) Field of Classification Search
CPC ........ G06F 3/065; G06F 3/067; G06F 3/0617; G06F 11/16; G06F 11/2071; G06F 11/1435; G06F 2201/84

USPC .......................................................... 711/162
See application file for complete search history.

(56) References Cited

U.S. PATENT DOCUMENTS

| | | | |
|---|---|---|---|
| 6,144,699 A | 11/2000 | Albin et al. | |
| 6,763,436 B2 | 7/2004 | Gabber et al. | |
| 7,065,538 B2 | 6/2006 | Aronoff et al. | |
| 7,392,421 B1 | 6/2008 | Bloomstein et al. | |
| 7,461,103 B2 | 12/2008 | Aronoff et al. | |
| 7,631,021 B2 | 12/2009 | Sarma et al. | |
| 8,150,812 B2 | 4/2012 | Todd | |
| 9,116,633 B2* | 8/2015 | Sancheti | G06F 3/065 |
| 9,411,866 B2 | 8/2016 | Bartholoma et al. | |
| 9,678,679 B2* | 6/2017 | Chen | G06F 3/0619 |
| 2014/0337285 A1* | 11/2014 | Gokhale | G06F 3/065 |
| | | | 707/610 |

(Continued)

FOREIGN PATENT DOCUMENTS

EP 3528121 8/2019

*Primary Examiner* — David Yi
*Assistant Examiner* — Zubair Ahmed
(74) *Attorney, Agent, or Firm* — BainwoodHuang (57) ABSTRACT

Embodiments of the present disclosure provide a method and device for a storage system. The method may include: replicating, through a first replication process, data in a first storage device to a second storage device to obtain a data replica; replicating, through a second replication process, metadata of the data to the second storage device to obtain a first metadata replica; replicating, in the second storage device through a third replication process, the first metadata replica to obtain a second metadata replica; and performing data recovery based on the data replica and the second metadata replica.

10 Claims, 5 Drawing Sheets

(56) References Cited

U.S. PATENT DOCUMENTS

2016/0041887 A1* 2/2016 Davis ................ G06F 11/1612
714/6.2

* cited by examiner

METHOD AND DEVICE FOR STORAGE SYSTEM

RELATED APPLICATIONS

This application claim priority from Chinese Patent Application Number CN2015110176673, filed on Dec. 29, 2015 at the State Intellectual Property Office, China, titled "METHOD AND APPARATUS FOR STORAGE SYSTEM," the contents of which is herein incorporated by reference in its entirety

FIELD

The present disclosure relates generally to a technical field of a storage system, and more particularly to a method and an apparatus for a storage system.

BACKGROUND

In a disaster recovery scenario of a storage system, users need to continuously access data on a local site, which is a replica of data on a remote site. In existing storage systems, the data replication between the two sites is stopped to access an identical local copy. Therefore, a data change on the remote site cannot be synchronized to the local site during the access to a local replica data, such that a protection against the remote site is lost.

Hence, it is desired to provide an improved method of continuously accessing a local replica data, without an extra change of a replication technique on existing systems.

SUMMARY

In light of the above existing problems in the prior art, one of the objectives of embodiments of the present disclosure is providing a method and device for a storage system in order to solve the above and other issues in the prior art.

According to a first aspect of the present disclosure, there is provided a method for a storage system. The method may include: replicating, through a first replication process, data in a first storage device to a second storage device to obtain a data replica; replicating, through a second replication process, metadata of the data to the second storage device to obtain a first metadata replica; replicating, in the second storage device through a third replication process, the first metadata replica to obtain a second metadata replica; and performing data recovery based on the data replica and the second metadata replica.

In some embodiments, the method may further include: ceasing the third replication process during the data recovery.

In some embodiments, the method may further include: performing at least one of the first replication process or the second replication process during the data recovery.

In some embodiments, the method may further include: performing the third replication process by using a snapshot technique.

In some embodiments, the method may further include: performing at least one of the first replication process or the second replication process by using a mirroring technique.

In some embodiments, the metadata may include at least one of a file system, a snapshot, or a network configuration.

In some embodiments, the storage system may include a Network Attached Storage (NAS) system. In these embodiments, performing the data recovery may include: recreating a NAS object based on the data replica and the second metadata replica.

According to a second aspect of the present disclosure, there is provided an apparatus for a storage system. The apparatus may include: a first replication unit configured to replicate, through a first replication process, data in a first storage device to a second storage device to obtain a data replica; a second replication unit configured to replicate, through a second replication process, metadata of the data to a second storage device to obtain a first metadata replica; a third replication unit configured to replicate, in the second storage device through a third replication process, the first metadata, replica to obtain a second metadata replica; and a data recovery unit configured to perform data recovery based on the data replica and the second metadata replica.

According to a third aspect of the present disclosure, there is provided a computer-readable storage medium having computer-readable program instructions stored thereon. The computer-readable program instructions may be used to perform the method according to the first aspect.

According to a fourth aspect of the present disclosure, there is provided a computer system including an apparatus according to the third aspect.

Compared with the existing methods, the embodiments of the present disclosure offer at least the following advantages. First of all, with the embodiments of the present, disclosure, replica data may be continuously accessed without stopping data replication. Then, the embodiments of the present disclosure make use of known techniques, such as mirroring and snapshot techniques, thus without a significant change to current storage systems.

BRIEF DESCRIPTION OF THE DRAWINGS

With reference to the drawings and the detailed description below, it is easy to understand the above and other objectives, features and advantages of the embodiments of the present disclosure. In the drawings, several embodiments of the present disclosure are shown in an illustrative yet non-restrictive manner, wherein.

DETAILED DESCRIPTION

The principle and spirit of the present disclosure will be described with reference to several example embodiments shown in the drawings. It is to be appreciated that the description of these specific embodiments is only for those skilled in the art to better understand and implement the present disclosure, rather than limiting the scope of the present disclosure in any manners.

Figure 1:
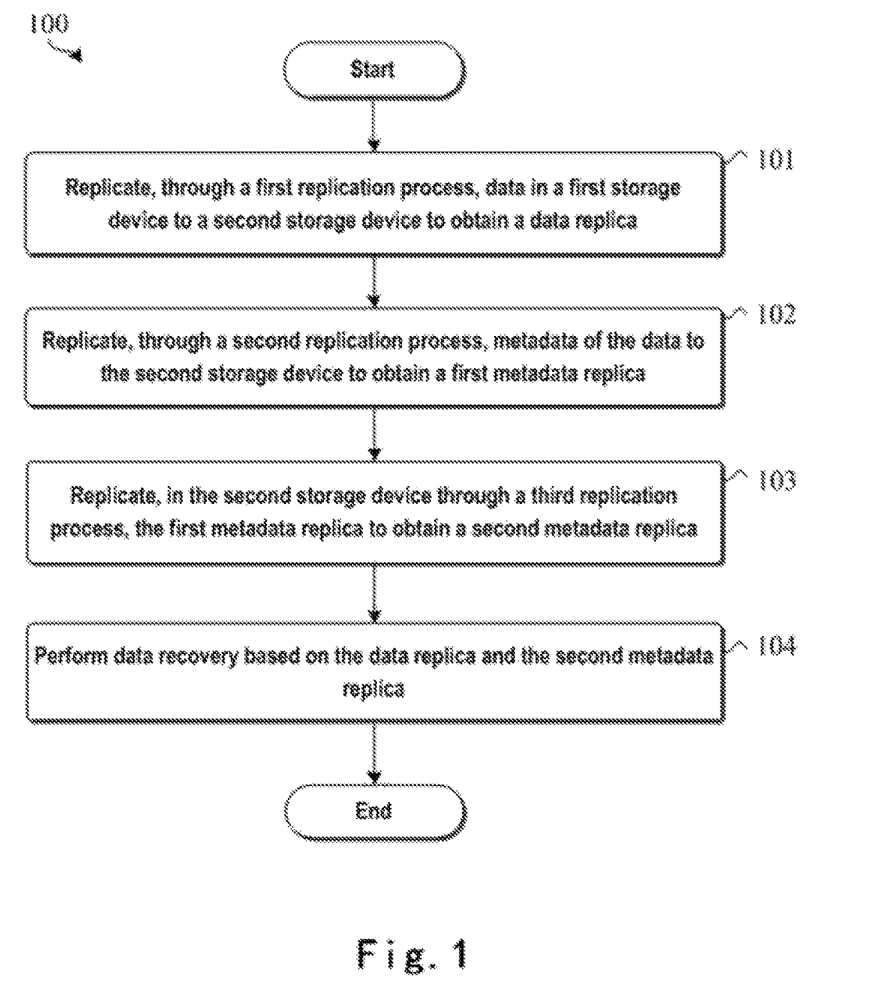
FIG. 1 schematically shows a flow chart of a method for a storage system according to the embodiments of the present disclosure.

FIG. 1 schematically shows a flow chart of a method 100 for a storage system according to the embodiments of the present disclosure. In some embodiments, an executive body of the method 100 may be an entity related to the storage system. In some specific embodiments, the executive body of the method 100 may be an apparatus 400 later described in combination with FIG. 4.

As illustrated in FIG. 1, the method 100 proceeds to a step 101 after the beginning. In the step 101, the executive body of the method 100 may replicate, through a first replication process, data in a first storage device to a second storage device to obtain a data replica.

In some embodiments, the first storage device may be a local storage device used by a user, and the second storage device may be a remote storage device for disaster recovery. Those skilled in the art may understand that the local storage device and the remote storage device are not absolute. In some cases, the local storage device may be a remote storage device while the remote storage device may also act as a local storage device. They may be mirrors to each other.

In addition, in some embodiments, the replicated data may be any data related to the user in the first storage device. In some embodiments, the first replication process may be performed by using a mirroring technique. In some particular embodiments, the mirroring technique may be, for example, mirroring software MirrorView of EMC Corporation.

Next, the method 100 may proceed to a step 102. In the step 102, the executive body of the method 100 may replicate, through a second replication process, metadata of the data to the second storage device to obtain a first metadata replica.

Those skilled in the art may understand that the metadata may include data for describing data. In a specific technical scenario of the method 100, the metadata replicated to the second storage device may refer to data for descripting the data replicated from the first storage device to the second storage device. In some particular embodiments, the metadata may include at least one of a file system, a snapshot or a network configuration.

In some embodiments, the second replication process may be performed by using a mirroring technique. In some particular embodiments, the mirroring technique may be, for example, mirroring software MirrorView of EMC Corporation.

Then, the method 100 may proceed to a step 103. In the step 103, the executive body of the method 100 may replicate, in the second storage device through a third replication process, the first metadata replica to obtain a second metadata replica.

In some embodiments, the first metadata replica may be stored in a storage space represented by a logic unit number LUN, and the second metadata replica may be stored in a storage space represented by a further logic unit number LUN. Storing the first and second metadata replica in different LUNs respectively may facilitate replicating the first metadata replica to obtain the second metadata replica by using a replication technique for LUNs.

In some embodiments, the third replication process may be performed by using a snapshot technique. In some particular embodiments, the snapshot technique may be, for example, snapshot software SnapView Clone of EMC Corporation.

Subsequently, the method 100 may proceed to a step 104. In the step 104, the executive body of the method 100 may perform data recovery based on the data replica and the second metadata replica. Those skilled in the art may understand that data and its various states in the first storage device may be fully recovered in the second storage device, because the second storage device has a data replica of the data in the first storage device and a metadata replica of the data.

In some embodiments, the third replication process may be ceased during the data recovery. As such, the data recovery by using the second metadata replica is further facilitated.

In some embodiments, the first replication process and/or the second replication process may be performed during the data recovery. Therefore, during the data recovery, there is no need for stopping a data replication process or a metadata replication process from the first storage device to the second storage device, such that a data change on the first storage device may be acquired at the second storage device.

In some embodiments, the storage system regarding the method 100 may include a Network Attached Storage (NAS) system. In these embodiments, the step 104 may further include: recreating a NAS object based on the data replica and the second metadata replica, so as to seamlessly provide a NAS service to a NAS client.

The method 100 may end after the completion of the step 104.

In the following, embodiments of the present disclosure are further explained by describing a specific example with reference to FIGS. 2 and 3. In specific examples of FIGS. 2 and 3, a file level automatic recovery mechanism in a particular scenario according to the embodiments of the present disclosure is described. In the mechanism, a NAS server, together with all its file systems, snapshots and network configurations, is replicated to the remote site. In case of a fault happens on the local site, all the NAS clients may seamlessly access the data service on the remote site. This automatic recovery mechanism for a file may specifically be based on a block level replication feature MirrorView/S and a snapshot feature SnapView.

Figure 2:
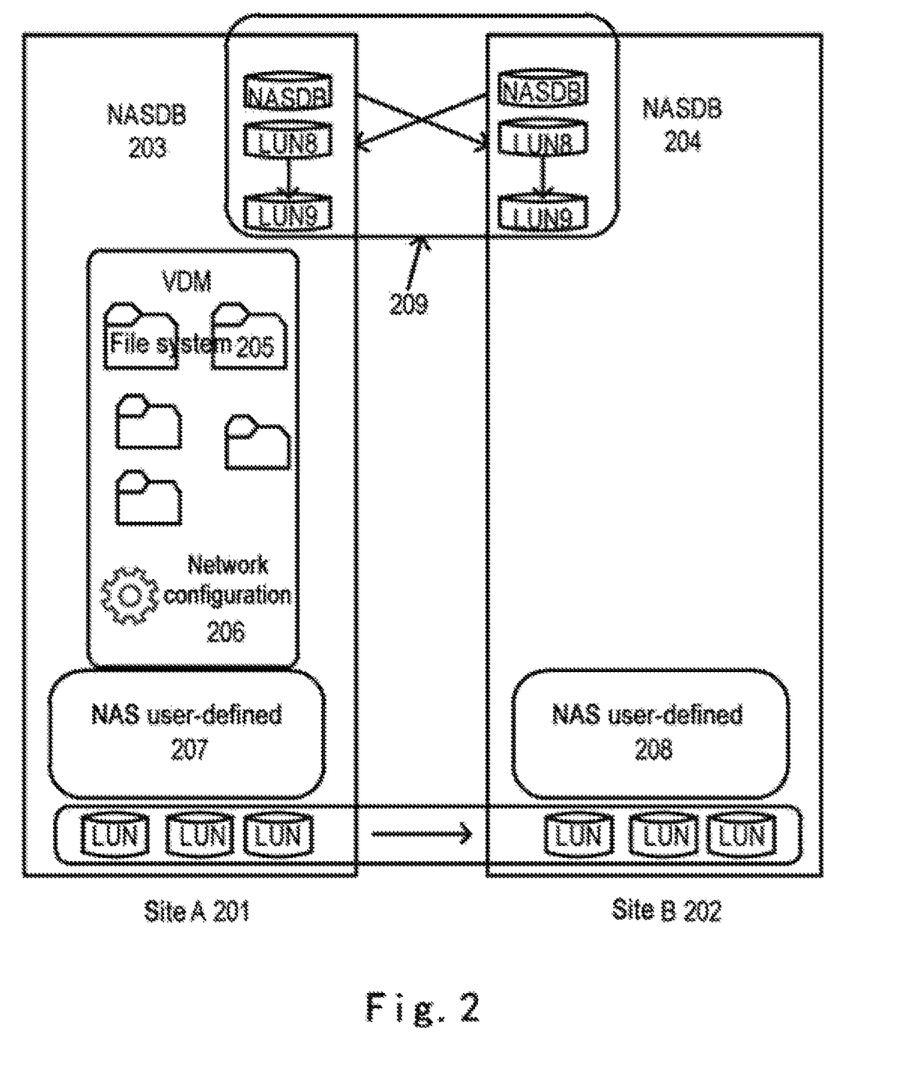
FIG. 2 schematically shows a schematic diagram of configuration of an example storage system according to the embodiments of the present disclosure.

FIG. 2 schematically shows a schematic diagram of configuration of an example storage system according to the embodiments of the present disclosure.

As shown in FIG. 2, on a site A 201, the NAS server (e.g., VDM of EMC Corporation), and together with all its file system 205, snapshots (not shown) and network configurations 206 etc., is grouped into a NAS user-defined pool 207. Additionally. the data LUNs under the user-defined pool are replicated to a site B 202 by using MirrorView CG (consistency group), to obtain a NAS user-defined pool 208.

Furthermore, as shown in a block 209 in FIG. 2, the NAS database NASDB 203, which may contain the metadata for NAS objects (file systems, snapshots etc.), may be replicated to one LUN (e.g., LUN8) of the site B 202 by using MirrorView CG. In addition, the LUN8 may be replicated to a LUN9 by using SnapView Clone of EMC Corporation on the site B 202.

If a fault happens on the site A 201. a replica of NASDB 203 (stored in LUN9) of the site A can be read on the site B 202, and the NAS objects are recreated on the site B 202 using the data LUNs.

If the user wants to read NASDB 203 of the site A 201, only the data transfer of the SnapView Clone needs to be stopped without the need to stop the data transfer of the MirrorView CG between the site A 201 and the site B 202. This ensures a continuous access to the local replica data.

Figure 3:
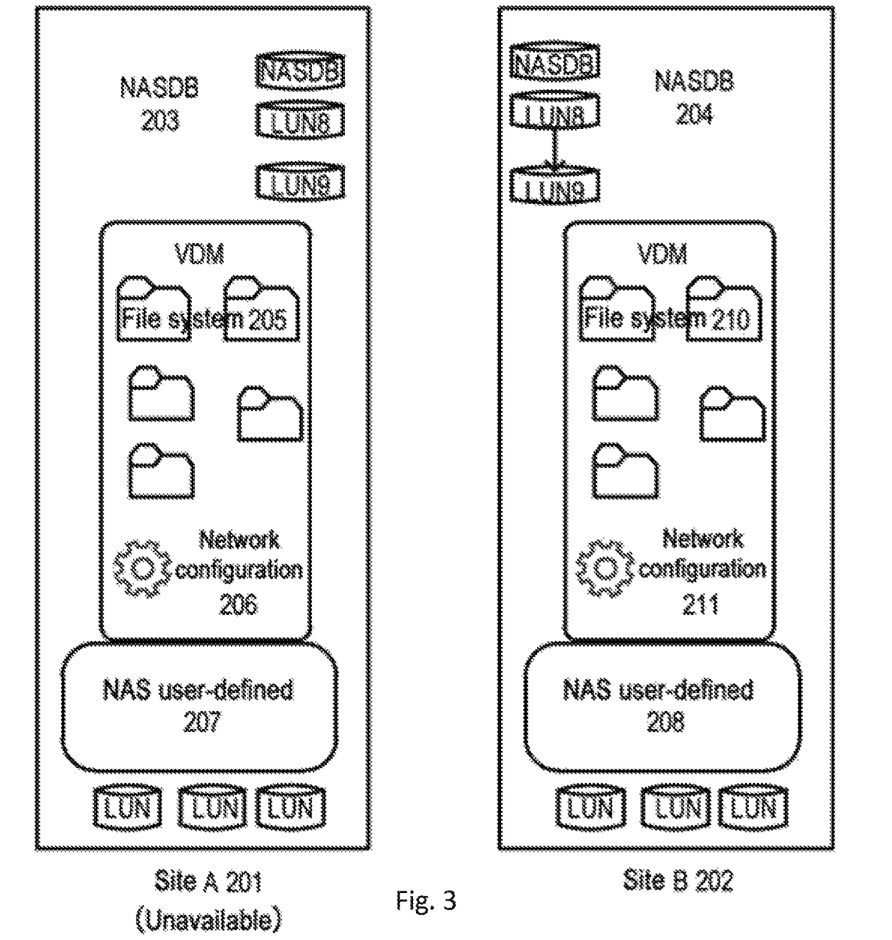
FIG. 3 schematically shows a schematic diagram of disaster recovery of an example storage system according to the embodiments of the present disclosure.

FIG. 3 schematically shows a schematic diagram of disaster recovery of an example storage system according to the embodiments of the present disclosure.

As shown in FIG. 3, in case that the site A 201 encounters a fault or becomes unavailable due to other reasons, the storage system may read metadata stored in LUN9 of the site B 202. Then, the NAS objects (e.g., VDM, the file system 201, the network configuration 211 etc.) may be recreated on the data LUNs and the NAS service may seamlessly be provided to the NAS clients originally connected to the site A 201.

Figure 4:
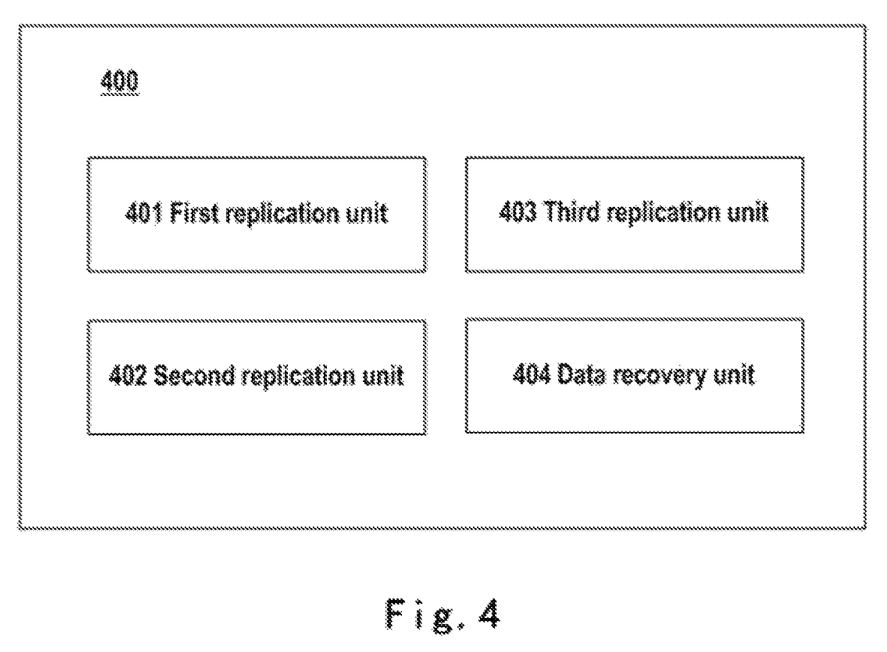
FIG. 4 schematically shows a block diagram of an apparatus for a storage system according to the embodiments of the present disclosure.

FIG. 4 schematically shows a block diagram of an apparatus 400 for a storage system according to the embodiments of the present disclosure. Those skilled in the art may understand that FIG. 4 only shows units or components in the apparatus 400 which are closely related to the embodiments of the present disclosure. In the specific implementation, the apparatus 400 may include other function units or components enabling its normal operation. Furthermore, those skilled in the art may further understand that there may be necessary Connections between the units of the apparatus 400.

As shown in FIG. 4, the apparatus 400 may include: a first replication unit 401, a second replication unit 402, a third replication unit 403 and data recovery unit 404. In some embodiments, the first replication unit 401 may be configured to replicate, through a first replication process, data in a first storage device to a second storage device to obtain a data replica. The second replication unit 402 may be configured to replicate, through a second replication process, metadata of the data to a second storage device to obtain a first metadata replica. The third replication unit 403 may be configured to replicate, in the second storage device through a third replication process, the first metadata replica to obtain a second metadata replica. The data recovery unit 404 may be configured to perform data recovery based on the data replica and the second metadata replica.

In some embodiments, the third replication unit 403 may be further configured to cease the third replication process during the data recovery. In some embodiments, the first replication unit 401 is further configured to perform the first replication process during the data recovery, and/or the second replication unit 402 is further configured to perform the second replication process during the data recovery.

In some embodiments, the first metadata replica is stored in a storage space represented by a logic unit number LUN and the second metadata replica is stored in a storage space represented by a further logic unit number LUN.

In some embodiments, the third replication unit 403 is further configured to perform the third replication process by using a snapshot technique. In some embodiments, the first replication unit 401 is further configured to perform the first replication process by using a mirroring technique, and/or the second replication unit 402 is further configured to perform the second replication process by using a mirroring technique.

In some embodiments, the metadata may include at least one of a file system, a snapshot or a network configuration.

In some embodiments, the storage system may include a Network Attached Storage (NAS) system. In these embodiments, the data recovery unit 404 may be further configured to: recreate a NAS object based on the data replica and the second metadata replica.

Figure 5:
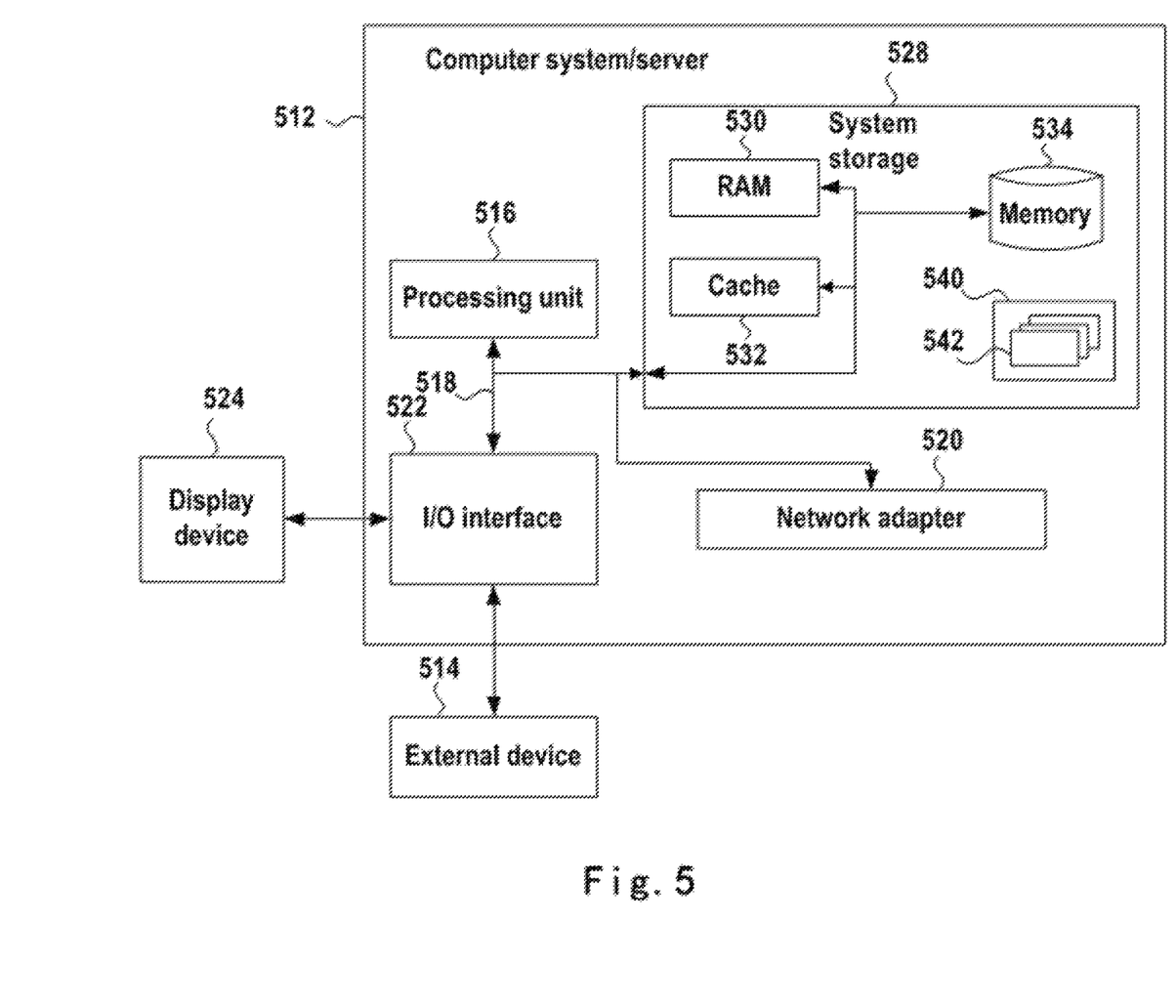
FIG. 5 schematically shows a block diagram of an example computer system/server which may be used for implementing embodiments of the present disclosure.

FIG. 5 schematically shows a block diagram of an example computer system/server 512 which may implement embodiments of the present disclosure. It should be noted that the computer system/server 512 shown in FIG. 5 is just an example, which does not, restrict the embodiments of the present disclosure in functions and application range.

As shown in FIG. 5, the computer system/server 512 is represented by a universal computer device. The components of the computer system; server 512 include but not limited to: one or more processors or processing units 516, a system storage 528 and bus 518 connecting various system components (including system storage 528 and processing unit 516).

The bus 518 represents one or more of several bus architectures, including memory bus, or memory controller, peripheral bus, accelerated graphic port, processor or local bus using any of the various bus architectures. For example, the system architectures include but not limited. to Industry Standard Architecture (ISA) bus, Micro Channel Architecture (MCA) bus, enhanced ISA bus, Video Electronics Standards Association (VESA) local bus and Peripheral Component Interconnect (PCI) bus.

The computer system/server 512 typically includes various computer-readable medium, which may be any available medium accessed by the computer system/server 512, including volatile and non-volatile medium and removable and non-removable medium.

The system storage 528 includes computer system readable medium in a form of volatile memory, e.g., memory 530 and/or buffer 532. The computer system/server 512 may further include other removable and non-removable and volatile and non-volatile computer system storage medium. It may provide a disk for reading and writing the removable and non-volatile disk (e.g., floppy disk) and a compact disc for reading and writing the removable and non-volatile compact disc (e.g., CD-ROM, DVD-ROM or other optical medium), which is not illustrated in FIG. 5. In such case, each disk may connect to the bus 518 via one or more data medium interfaces. The memory 534 may include at least one program product having a group (e.g., at least one) of program modules, the program modules being configured to perform functions of each implementation of the present disclosure.

A program/utility tool 540 having at least one program module 542 is stored in the memory 534 for example. Such program module 542 includes but not limited to: an operation system, one or more applications, other program modules and program data. Each one or any combination of these examples may include an implementation of network environment. The program module 542 normally executes functions and/or method in the embodiments described in the present disclosure.

The computer system/server 512, as required, may communicate with one or more external devices (e.g., display device 524, storage device 514 etc.) and a device that enables users to interact with the computer system/server 512, and/or any devices (e.g., network card, modem etc.) that enable the computer system/server 512 to communicate with one or more other computer devices. The above communication may be performed through input/output (I/O) interface 522. Besides, the computer system/server 512 may also communicate with one or more networks (e.g., Local Area Network (LAN), Wide Area Network (WAN) and/or public networks, such as Internet) via a network adapter 520. As shown in FIG. 5, the network adapter 502 communicates with other modules of the computer system/server 512 through bus 518. It should be understood that other hardware and/or software modules may be used in combination with the computer system/server 512 although it is not shown in FIG. 5, wherein the hardware and/or software modules include but not limited to: microcode, device disk, redundancy processing units, external disk drive array, RAID system, tape disk and data backup storage system, etc.

In the description of the embodiments of the present disclosure, the term "comprise" or "include" and other similar expressions indicate an inclusion in an open manner, i.e., "include, but are not limited to." The term "based on" represents "at least partly based on." The term "an embodiment" or "the embodiment" means "at least one embodiment."

It should note that the embodiments of the present disclosure may be implemented by hardware, software or the combination of hardware and software. The hardware part may be implemented by special logic while the software part may be stored in the memory and executed by an appropriate instruction execution system, such as a microprocessor or special-designed hardware. Those skilled in the art may understand the above device and method may be implemented by means of computer executable instructions or within the processor control code, for example, such code is provided for a programmable memory or data carrier such as optical or electronic signal carrier.

Furthermore, although the drawings describe the operation of the method of the disclosure in a specific sequence, it does not necessarily require or suggest that the operation must be executed in the specific sequence or all shown operations must be executed to realize the expected result. On the contrary, the order of the steps depicted in the flow chart may be altered. Additionally or alternatively, some steps may be omitted or multiple steps may be combined into one step for execution, and/or one step is disintegrated into multiple steps for execution. It should also note that the features and functions of two or more apparatuses in the disclosure may be materialized in one apparatus. Conversely, the feature and function of one apparatus described above may be materialized by multiple apparatuses.

Although the disclosure is described with reference to multiple specific embodiments, it should be understood that the present disclosure is not restricted to the embodiments of the disclosure. The present disclosure aims to encompass all kinds of modifications and equivalent arrangements included within the spirit and scope of the appended claims.

We claim:

1. A method for a Network Attached Storage (NAS) system, comprising:
    replicating, through a first replication process, data in a first storage device to a second storage device to obtain a data replica;
    replicating, through a second replication process, metadata of the data from the first storage device to the second storage device to obtain a first metadata replica, wherein the metadata of the data comprises a file system and a snapshot;
    replicating, in the second storage device through a third replication process, the first metadata replica to obtain a second metadata replica, at least in part by replicating a first LUN containing the first metadata replica in the second storage device to a second LUN in the second storage device, wherein the second metadata replica is enabled to be used while the first replication process continues processing;
    in response to the first storage device becoming unavailable, performing data recovery to recreate a NAS object in the second storage device based on the data replica and the second metadata replica, at least in part by reading the second metadata replica from the second LUN in the second storage device, to seamlessly provide a NAS service to at least one NAS client from the second storage device in response to recreating the NAS object in the second storage device based on the data replica and the second metadata replica;
    ceasing the third replication process during the data recovery; and
    performing both the first replication process and the second replication process during the data recovery, while reading the second metadata replica from the second LUN in the second storage device, such that a data change in the data in the first storage device during the data recovery is acquired in the data replica at the second storage device.

2. The method of claim 1, further comprising:
    performing the third replication process by using a snapshot technique.

3. The method of claim 1, further comprising:
    performing at least one of the first replication process or the second replication process by using a mirroring technique.

4. The method of claim 1, wherein the metadata further comprises a network configuration.

5. The method of claim 1, wherein the first replication process replicates a plurality of data LUNs in a user-defined pool from the first storage device to the second storage device.

6. A computer program product for a Network Attached Storage (NAS) system, the computer program product comprising:
    a non-transitory computer readable medium encoded with computer-executable code, the code configured to enable the execution of:
        replicating, through a first replication process, data in a first storage device to a second storage device to obtain a data replica;
        replicating, through a second replication process, metadata of the data to the second storage device to obtain a first metadata replica, wherein the metadata of the data comprises a file system and a snapshot;
        replicating, in the second storage device through a third replication process, the first metadata replica to obtain a second metadata replica, at least in part by replicating a first LUN containing the first metadata replica in the second storage device to a second LUN in the second storage device, wherein the second metadata replica is enabled to be used while the first replication process continues processing;
        in response to the first storage device becoming unavailable, performing data recovery to recreate a NAS object in the second storage device based on the data replica and the second metadata replica at least in part by reading the second metadata replica from the second LUN in the second storage device, to seamlessly provide a NAS service to a NAS client;
        ceasing the third replication process during the data recovery; and
        performing both the first replication process and the second replication process during the data recovery, while reading the second metadata replica from the second LUN in the second storage device, such that a data change in the data in the first storage device during the data recovery is acquired in the data replica at the second storage device.

7. The computer program product of claim 6, wherein the code is further configured to enable the execution of:
    performing the third replication process by using a snapshot technique.

8. The computer program product of claim 6, wherein the code is further configured to enable the execution of:

performing the first replication process at least in part by replicating a plurality of data LUNs in a user-defined pool from the first storage device to the second storage device.

9. The computer program product of claim 6, wherein the code is further configured to enable the execution of:
performing at least one of the first replication process or the second replication process by using a mirroring technique.

10. The computer program product of claim 6, wherein the metadata further comprises a network configuration.

* * * * *